United States Patent [19]

Nakazawa et al.

[11] Patent Number: 4,935,764
[45] Date of Patent: Jun. 19, 1990

[54] STEPPING DRIVE UNIT FOR CAMERA

[75] Inventors: Isao Nakazawa; Takayuki Tsuboi, both of Kanagawa; Yasuhik Shiomi, Tokyo, all of Japan

[73] Assignee: Canon Kabushiki Kaisha, Tokyo, Japan

[21] Appl. No.: 219,854

[22] Filed: Jul. 13, 1988

Related U.S. Application Data

[63] Continuation of Ser. No. 938,448, Dec. 5, 1986, abandoned.

[30] Foreign Application Priority Data

Dec. 9, 1985 [JP] Japan ................................ 60-276522
Dec. 9, 1985 [JP] Japan ................................ 60-276523
Dec. 9, 1985 [JP] Japan ................................ 60-276524

[51] Int. Cl.$^5$ .............................................. G03B 3/10
[52] U.S. Cl. ................................. 354/400; 354/195.1
[58] Field of Search .......................... 354/400–407, 354/195.1, 195.12, 234.1, 446, 448; 350/255, 429, 430

[56] References Cited

U.S. PATENT DOCUMENTS

| | | | |
|---|---|---|---|
| 3,680,460 | 8/1972 | Starp | 354/230 |
| 3,987,461 | 10/1976 | Kondo | 354/448 |
| 4,021,821 | 5/1977 | Peterson | 354/405 |
| 4,031,383 | 6/1977 | Hosoe et al. | 354/406 X |
| 4,103,152 | 7/1978 | Stauffer | 354/405 |
| 4,182,555 | 1/1980 | Imura et al. | 354/402 |
| 4,274,720 | 6/1981 | Tsujimoto | 354/402 |
| 4,426,145 | 1/1984 | Hashimoto | 354/234.1 X |
| 4,653,892 | 3/1987 | Namai et al. | 354/234.1 X |

Primary Examiner—W. B. Perkey
Attorney, Agent, or Firm—Fitzpatrick, Cella, Harper & Scinto

[57] ABSTRACT

A stepping drive unit for cameras which is capable of stepwise driving a photographic optical system by operating a member which is placed into a reciprocating motion by means of an electromagnetic force on a plane substantially parallel with the photographic optical axis and not through a cam, whereby the transmission efficiency of a drive cam is increased. The drive is also capable of eliminating the need to employ a stepping drive in returning the photographic optical system to an initial position whereby the number of steps taken by the stepping drive is reduced, and of conducting its functions without applying any excessive impulsive force by stepwise increasing the amount of electricity charged to the electromagnetic drive member as the number of steps taken by the stepping drive increases, whereby the level of mechanical driving sounds is greatly reduced.

10 Claims, 7 Drawing Sheets

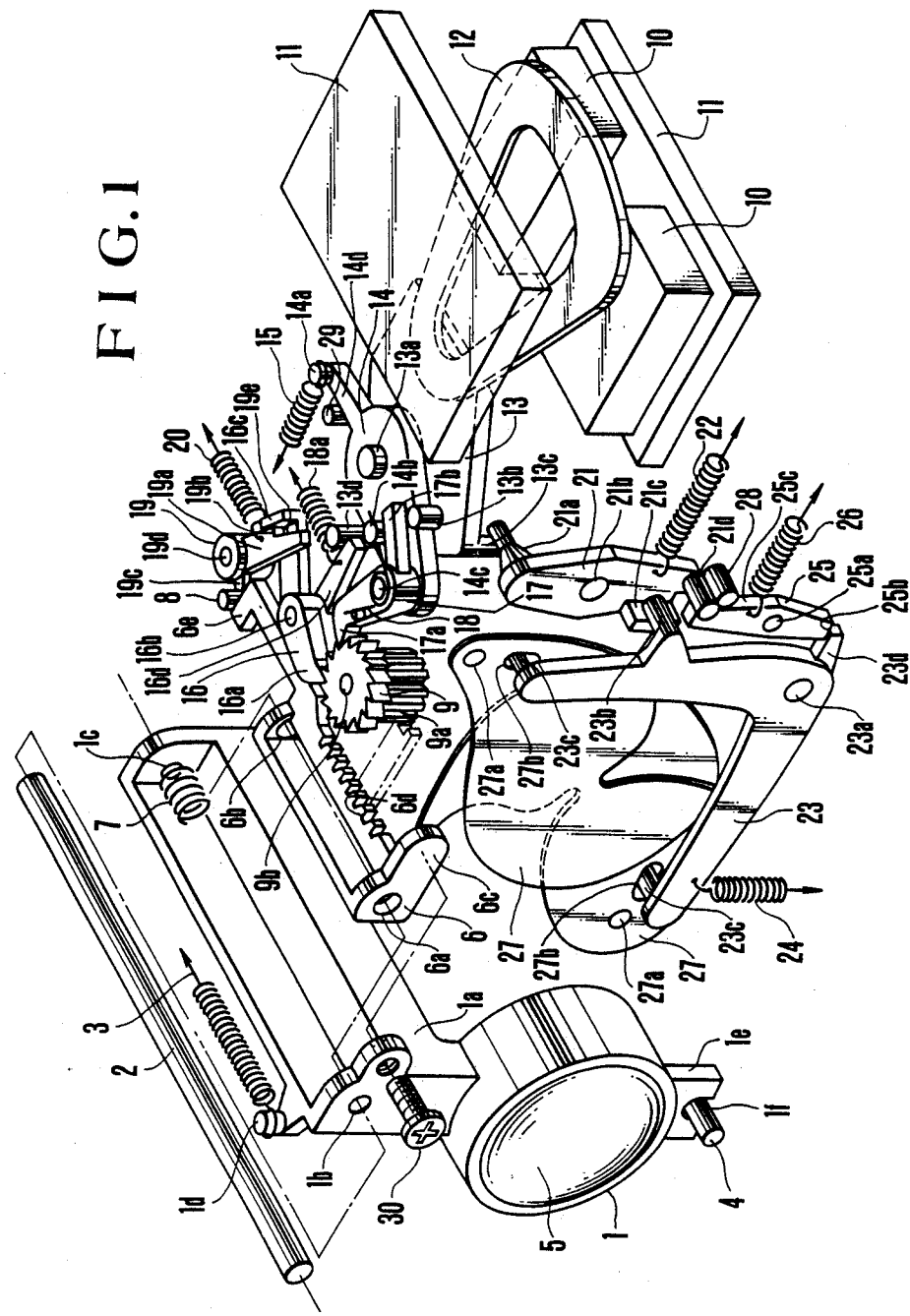

FIG.9 (a) PRIOR ART
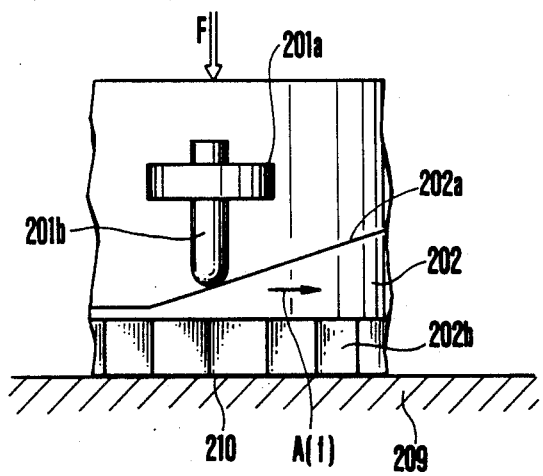
FIG.9 (b) PRIOR ART
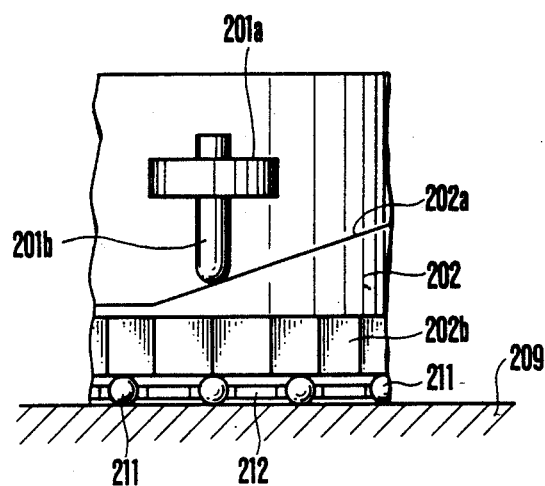

STEPPING DRIVE UNIT FOR CAMERA

This is a continuation of Ser. No. 938,448, filed 12/5/86, now abandoned.

BACKGROUND OF THE INVENTION

1. Field of the Invention

The present invention relates to a stepping drive unit for cameras which is capable of driving stepwise a photographic optical system by means of a member which is put into a reciprocating motion by electromagnetic force for the purpose of focusing.

2. Description of the Related Art

This type of stepping drive unit has been conventionally proposed in U.S. Pat. No. 4,560,266, and U.S. Pat. application Ser. Nos. 713,439, 713,473, 857,522, 857,524, and 835,966.

However, in such stepping drive units, the above-described photographic optical system is driven stepwise by repeatedly striking a ratchet for moving the photographic optical system with a claw member which is put into a reciprocating motion by electromagnetic force, and thus these units have suffered the disadvantage that the continuous sound of the impacts produced by the claw member hitting the ratchet can be heard externally to the discomfort of the user.

SUMMARY OF THE INVENTION

The present invention has been achieved with a view to solving the above-mentioned problem and an object of the present invention is to provide a stepping drive unit for cameras which is capable of reducing the occurrence of mechanical sound as much as possible.

To this end, the present invention provides a configuration in which a driving force for moving the photographic optical system is effectively transmitted without the need for a ratchet to be struck by a claw member with large force, when the latter is put into a reciprocating motion by means of electromagnetic force, whereby the occurrence of mechanical sounds can be reduced as much as possible.

Conventional stepping drive units will first be considered from the viewpoint of the production of mechanical sounds. In conventional stepping drive units, since an electromagnetic drive member is driven on a plane which is vertical to the photographic optical axis, the driving movement is converted to a movement in the direction of the photographic optical axis through a cam member having a certain inclination or a screw member such as a helicoid and thereby performs lens driving.

In such a cam method, a lens barrel is pushed against the cam by the energizing force of a spring, and thus there has been a disadvantage in that the transmission efficiency of the driving force is very small because of the large loss produced by virtue of the friction between abutting portions.

Particularly in the case of a stepping mechanism which functions by utilizing the cam method, it is necessary to drive the cam member by means of the energizing force used for pushing the lens barrel against the cam. The feature of this mechanism will next be described in detail with reference to FIGS. 8 and 9(a) and 9(b).

FIG. 8 is a schematic drawing of the stepping mechanism of the cam method. Reference number 201 denotes a lens barrel, and a projection 201b is provided in such a manner as to be planted in an arm 201a and slidably supported by a support bar 201c extending in the direction of the photographic optical axis, the projection 201b being biased by means of a spring 208 so as to abut against a cam portion 202a.

Reference number 202 denotes a cam member which comprises a cam portion 202a and a ratchet portion 202b as a unit and which is rotatably supported on a shaft 202c. Reference number 203 denotes a drive lever which is rotatably supported on a shaft 203b and which is rotated by means of the driving force of an electromagnetic drive member (not shown). A dowel 203a is planted in the drive lever 203.

Reference number 204 denotes a feed claw which is rotatably engaged around the dowel 203a and is biased to rotate counterclockwise by a spring 206 and thereby engages with the ratchet portion 202b.

Reference number 205 denotes a stopping member which is rotatably supported on a shaft 205a and is engaged therewith. This is biased to rotate counterclockwise thereby to engage with the ratchet portion 202b.

In the above-mentioned configuration, when the drive lever 203 is rotated clockwise by the driving force of the electromagnetic member, the feed claw 204 pushes the ratchet portion 202b so that the cam portion 202 is rotated counterclockwise and one claw is fed. As a result of this rotation, the projection 201b moves the lens barrel 201 forwardly to the left of the drawing, following-up the cam portion 202a.

The feed claw 204 is of such a configuration that, during this operation, it will to some extent advance further forward after the stopping claw 205 has ridden over one crest of the ratchet. This is safety feed feature for assuredly performing the feeding of one crest as a measure against various noises that might be caused by such factors as the deviation of certain members, and thus it is impossible for this feature to be omitted from the mechanical viewpoint.

After one crest has been safely fed, the ratchet portion 202b is in an unstable state since it is not engaged with any other members and its position is not determined due to the noises caused by variations of the feeding amount. For this reason, the position of a photographic lens is not determined either and focusing is not carried out. Therefore, the cam member 202 must be energized to rotate clockwise in order to determine the position thereof when engaging with the stopping claw 205, the energizing force being provided by the spring 208.

FIGS. 9(a) and 9(b) are side views of the cam member 202 and the lens barrel 201, wherein portions which are the same as those in FIG. 8 are denoted by the same reference numbers. F denotes the direction of the force which allows the projection 201b to be brought into pressure contact with the cam portion 202a, this force being divided by the cam portion 202a so as to produce the force (referred to as force f hereinafter) which acts to cause rotation in the clockwise direction (the direction of the arrow in FIG. 9(a)).

However, the force f is extremely small compared with the force F and it is difficult to rotate the cam member 202 clockwise while overcoming the friction produced at the point of contact between the projection 201b and the cam portion 202a and at the contact surface 210 between the cam member 202 and a base plate 209 which supports the cam member 202. In practice, this rotation cannot be realized unless such friction is greatly reduced by providing rolling contact between the cam member 202 and the base plate 209 which is effected by interposing several steel balls 211 and a separating plate 212 so that they are disposed at given intervals, as shown in FIG. 9(b).

As described above, in conventional stepping drive units, it is necessary that the claw member strikes the ratchet with a strong force during the stepping drive because of the extremely poor transmission efficiency of the force generated by the electromagnetic drive member. This leads to the generation of a loud mechanical sound. In contrast, the present invention enables a photographic optical system to be driven stepwise by operating a member which is put into a reciprocating motion by means of electromagnetic force on a plane substantially parallel to the photographic optical axis, without using a cam. Thus, the transmission efficiency of the drive force is greatly increased, stepping drive is made possible with a small drive force, and the generation of mechanical sounds is reduced as low a level as possible.

Furthermore, in conventional lens-barrel drive apparatus, it has been customary for the focus to be adjusted by a stepping mechanism which drives a photographic optical system by an amount equivalent to a certain number of teeth which is determined on the basis of information with respect to a subject distance. Next, the exposure is controlled and then the photographic optical system is driven by the stepping mechanism by an amount equivalent to the remaining number of teeth, and the photographic optical system finally being returned to its initial position in a final driving step by cutting off the interlock with the stepping mechanism.

Thus, the photographic optical system must be stepwise driven until the final position regardless of the position thereof brought about by the focus adjustment. In addition, since as described above cutting off the interlock with the drive mechanism in the final step of the drive involves an increased amount of drive relative to the number of teeth, it is necessary to effect driving for an amount remarkably greater than that required for the actual focus adjustment. Thus, there is an increase in the length of time during which the mechanical sounds are generated by the stepping mechanism.

Therefore, the present invention makes it possible to reduce the time during which the driving sounds are generated by returning the photographic optical system to its initial position without any need to again conduct the stepping drive after the exposure control has been completed.

Additionally, in conventional stepping drive units, the time T, during which driving current is passed, is constant, as shown in FIGS. 4(a) and 4(b). Consequently, the length of time during which electrical current is passed is set in correspondence with the largest possible load, and electrical charging is carried out to allow for the longest possible time.

However, the load involved in driving a member increases as the distance to be moved increases, and if the time during which electrical current is passed is set at the maximum, the member which is driven strongly abuts against a stopper which prevents that member from excessive movement at the initial step in which the load is small and there is an ample amount of drive, so that a high level of mechanical sounds is generated.

In contrast, in the present invention, the amount of electricity charged in the electromagnetic drive member is made small at the initial step of the stepping drive and gradually made larger as the stepping drive progresses, whereby the occurrence of mechanical sounds due to the stepping drive is reduced as far as possible.

Other objects of the present invention will become apparent from the following detailed description of the embodiment.

BRIEF DESCRIPTION OF THE DRAWINGS

FIG. 1 is a perspective view showing the internal mechanism of a camera to which the stepping drive unit is applied.

FIGS. 9(a) and 9(b) are side views showing the cam portion of the conventional stepping mechanism.

DETAILED DESCRIPTION OF THE PREFERRED EMBODIMENT

Figure 2A:
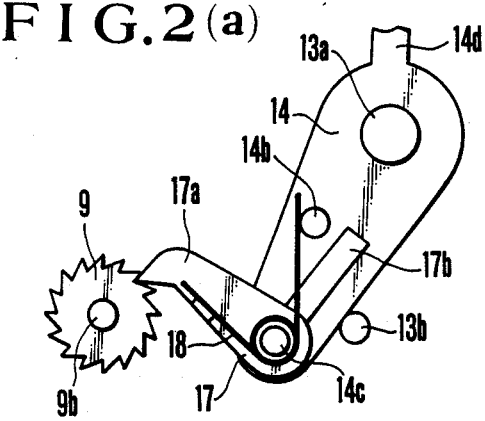
FIGS. 2(a), 2(b) and 2(c) are front views showing the feed operation of the stepping drive unit.

An embodiment of the present invention will be explained with reference to the drawings.

FIG. 1 is a perspective view showing the internal mechanism of a camera to which the stepping mechanism of the present invention is applied. In this drawing, reference number 1 denotes a lens barrel which is provided with two arms 1a and 1e in opposite positions on the periphery thereof. The arm 1a extends rearwardly in parallel with the axis of the lens barrel 1, which is provided with holes 1b, 1c for passing a support bar 2 therethrough at both sides thereof and with a dowel 1d in another position. The other arm 1e is provided with a notch 1f in which a shaft 4 provided on the base plate (not shown) is engaged.

The above-described support bar 2 slidably supports the lens barrel 1 and a lens-barrel interlocking member 6 described below by engagement therewith and is supported by the base plate (not shown). Reference number 5 denotes a group of photographic lenses which are supported in the lens barrel 1. The above-described lens-barrel interlocking member 6 has a rack portion 6d which is connected to the gear portion 9a of a ratchet member 9 described below, which is slidably supported by engagement with the support bar 2 passing through the holes 6a, 6b, and which is energized forwardly (to the left as viewed in the driving) by a spring 7 supported by the support bar 2 passing therethrough. However, since an arm 6c abuts against a focus adjusting screw 30, the lens barrel 1 and the lens-barrel interlocking member 6 integrally slide along the support bar 2. Although they are biased rearwardly (to the right as viewed in the drawing) by a spring 3, the arm 6e abuts against the dowel 8 planted on the base plate (not shown) in a charge state and thereby stops them.

Reference number 9 denotes a ratchet member which is rotatably supported by its engagement with a shaft 9b, and a concentrically formed gear 9a is engaged with the rack 6d of the lens-barrel interlocking member 6.

Reference number 10 denotes a permanent magnet and reference number 11 denotes a yoke for producing a magnetic field. Reference number 12 denotes a rotor adapted for use as an electromagnetic drive member which is supported by connection with a rotor receiving member 13. This rotor receiving member 13 is rotatably supported by its engagement with a shaft 13a, dowels 13b, 13c, 13d being planted therein.

Reference number 14 denotes a claw drive lever which is rotatably engaged with the shaft 13a and dowels 14a, 14b, 14c are planted thereon. This lever is constantly urged in the counterclockwise direction by a spring 15 which is hung over the dowel 14a and an arm 14d abuts against a dowel 29 planted on the base plate.

Reference number 16 denotes a ratchet claw which is rotatably engaged around the shaft 16b and is constantly urged in the counterclockwise direction by a spring 18a hung over the arm 16d and the claw portion 16a is thereby engaged with the ratchet member 9 and prevents it from rotating clockwise.

Reference number 17 denotes a feed claw which is rotatably engaged with the dowel 14c and is constantly urged in the counterclockwise direction by the spring 18, a claw portion 17a engaging with the ratchet member 9. The rotor receiving member 13, the claw drive lever 14, the ratchet claw 16, the feed claw 17, the latch claw 19, and the lens-barrel interlocking member 6 together constitute a motion member for transmitting the drive force of the rotor 12 to the lens barrel 1 in a plane substantially parallel with the photographic axis.

Reference number 19 denotes a latch claw which is rotatably engaged with a shaft 19d and constantly urged in the counterclockwise direction by a spring 20 hung over an arm 19a, an arm 19c abutting against the arm 6e of the lens barrel interlocking member 6.

Reference number 21 denotes a connection lever which is rotatably engaged with a shaft 21b and constantly urged in the counterclockwise direction by a spring 22, a dowel 21a planted at one end thereof abutting against the dowel 13c, and a wall 21c and a dowel 21d being planted at the other end.

Reference number 23 denotes a blade drive lever which is rotatably engaged with a shaft 23a and constantly urged in the counterclockwise direction by a spring 24, and an arm 23d is stopped by abutting against the side 25b of a stopping lever 25 described below, dowels 23b, 23c being planted therein.

The above-described stopping lever 25 is rotatably engaged with a dowel 25a and constantly urged in the clockwise direction by a spring 26, and the side 25c is stopped by abutting against a dowel 28 planted in the base plate (not shown), while the side 25b abuts against the arm 23d.

Reference number 27 denotes a shutter blade comprising two blades, which is rotatably engaged with a shaft 27a, the dowel 23c being engaged with a long groove 27b. Reference number 30 denotes a focus adjustment screw for achieving a proper focus adjusting to change the relative position between the lens barrel 1 and the lens-barrel interlocking member 6.

The operation of the apparatus will be described hereinafter. When the mechanism of a camera starts to operate when the shutter release button is pressed by a photographer, the distance between the camera and an object to be photographed is measured by a known form of distance measuring equipment.

Then, photographic lenses are moved to a position appropriate to the distance between the object and the camera so as to perform focusing.

When the rotor 12 is electrically charged on the AF side (referred to as "positive electrical charging" hereinafter), electrical current passes through the magnetic field formed by the permanent magnet 10 and the yoke 11, and this rotor 12 is thus subjected to a force generated in accordance with Fleming's left-hand rule. As a result, the rotor 12 and the rotor receiving member 13 rotate clockwise around the shaft 13a.

As the rotor receiving member 13 starts to rotate clockwise, the dowel 13b pushes the claw drive lever 14. Consequently, the claw drive lever 14 also starts to rotate clockwise around the shaft 13a, and the claw portion 17a of the feed claw 17 supported by the engagement around the dowel 14c which is planted in the drive lever 14 allows the ratchet member 9 to rotate counterclockwise.

When the ratchet member 9 is rotated counterclockwise, the gear portion 9a is also rotated counterclockwise and thus, the lens-barrel interlocking member 6 slides forwardly (to the left in the drawing) along the support bar 2 through the rack portion 6d which is connected to the gear portion 9a, and at the same time, the lens barrel 1 slides forwardly (also to the left).

As described above, when the rotor 12 is electrically charged in the positive direction, the claw portion 16a rides across one crest of the ratchet member 9 so that the photographic lenses are fed by one tooth, resulting in electrical charging in the reverse direction for a given period which is shorter than that of the electrical charging effected in the positive direction after the positive charging has taken place for a given period.

When the electrical charging to the rotor 12 in the positive direction is cut off, the rotor 12 and the rotor receiving member 13 are rotated counterclockwise by the urging force of the spring 15 through the claw lever 14 and the dowel 13b, but its responsiveness is weakened because of the inertial force of the abovedescribed clockwise rotation. The electrical charging in the reverse direction overcomes this inertial force and serves to realize the electrical charging in the reverse direction.

In such a manner, the claw drive lever 14, the rotor receiving member 13 and the rotor 12 are rotated counterclockwise, so that when the claw portion 17a of the feed claw 17 rides across the ratchet member 9 by one tooth and moves backward, the arm 14d of the claw drive lever 14 abuts against the dowel 29 and returns to its initial position.

The photographic lenses are fed by one tooth by means of the above-described operations, which are repeated until the photographic lenses are moved to a position corresponding to information about the distance between the camera and the object in order to achieve proper focusing.

Figure 3:
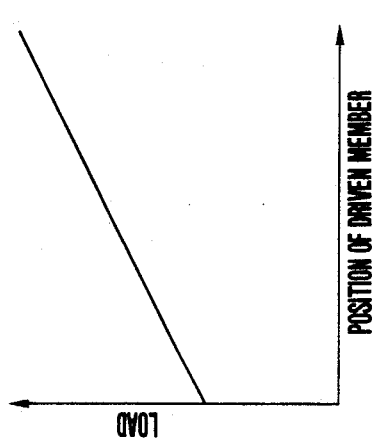
FIG. 3 is a graph showing the relationship between the position of a member to be driven and the load.

Since the lens barrel 1 is urged by the spring 3 in the direction which is opposite to the feed direction, the load is increased as the lens-barrel is moved in the feed direction in the manner shown in the graph in FIG. 3. It is a matter of common sense in dynamics that a relatively long period of time is required for moving a large substance by a given force.

Figure 4A:
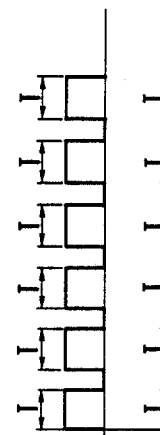
FIGS. 4(a), 4(b) and 4(c) are drawings showing the comparison of the driving current of the stepping drive unit with that of a conventional unit.
Figure 4B:
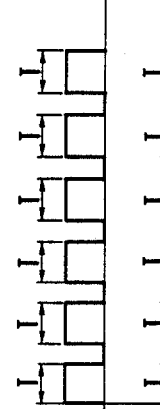
Figure 4C:
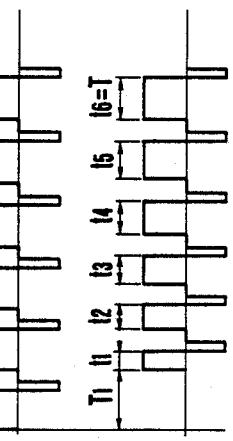

As described above, the electrical charging time T in the positive direction of the conventional example shown in FIGS. 4(a) and 4(b) is determined by the time required for the final feed operation with the maximum load. HOwever, in the present invention, the electrical charging time $t_6$ required for the final feed operation is the same as that of the conventional example ($t_6=T$), and this time is gradually reduced as the stepping drive nears the initial step. Namely, $t_1$ to $t_6$ may be the individual times required for each feed particular operation and are extended as the load increases due to the increased movement of the photographic lenses, as shown in FIG. 3.

Therefore, the present invention reduces the drive time by a time $T_1$, consumes electrical power efficiently, does not produce any excessive drive force in the first step of the stepping drive, and thus reduces the noise produced at the time of impact with a stopper. In addition, since electrical charging is conducted for a period of time which is appropriate for a particular feed operation and there is no excessive production of driving force, the amount of feeding is stable in every feed operation. Consequently, no stopper for controlling the amount of feeding is required and it is therefore possible to avoid noise normally produced by impact with the stopper.

Figure 5:
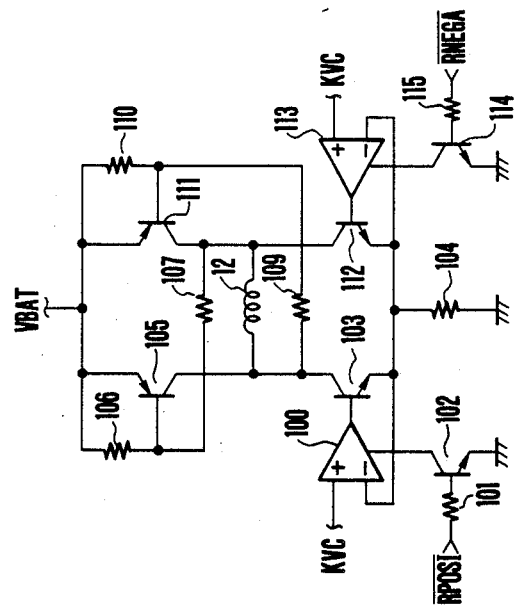
FIG. 5 is a drawing of the rotor driver circuit.
Figure 6:
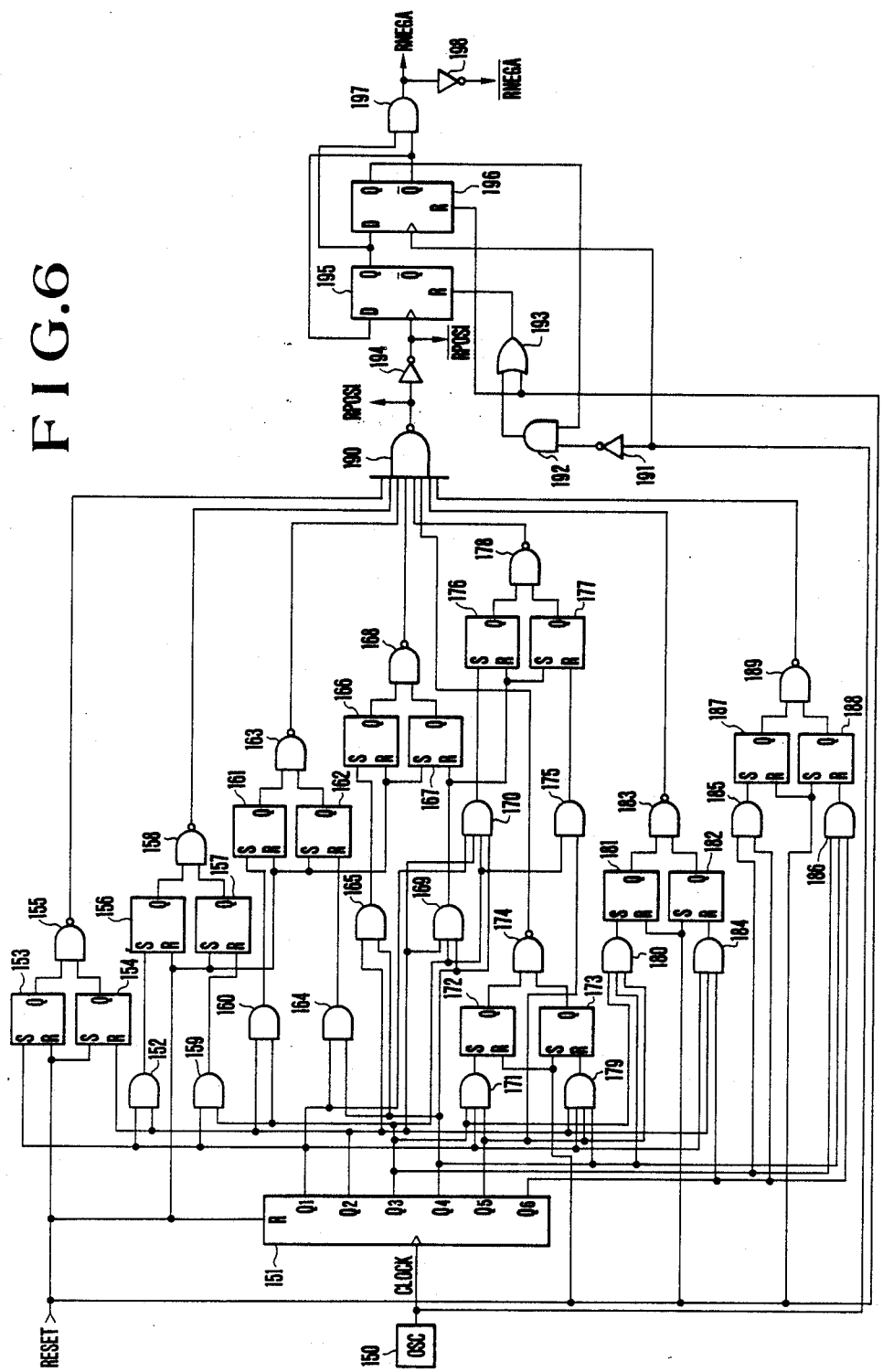
FIG. 6 is a drawing of the logic control circuit.
Figure 7:
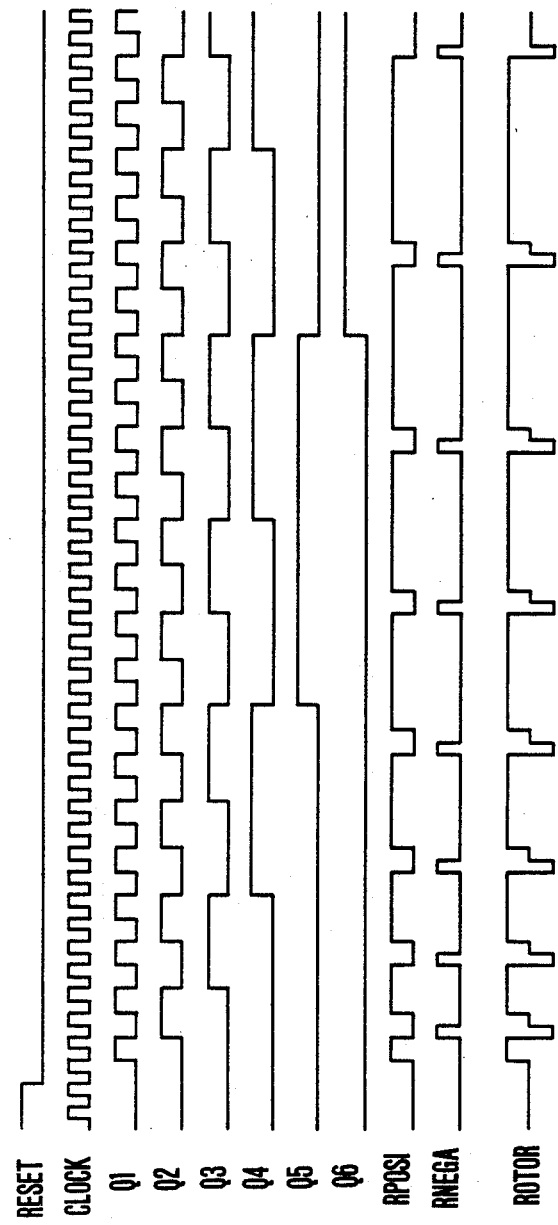
FIG. 7 shows timing charts.
Figure 8:
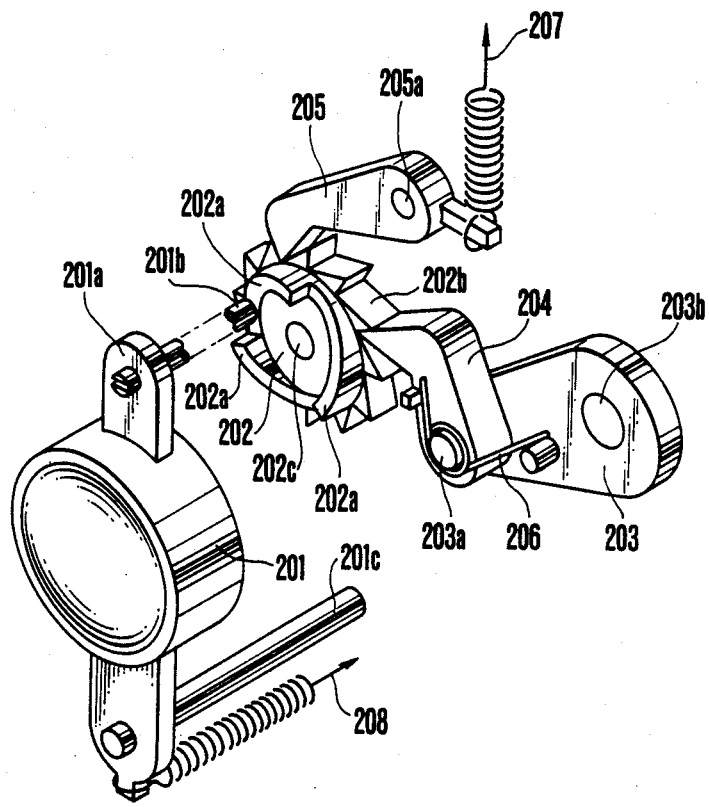
FIG. 8 is a perspective view schematically showing the stepping mechanism of the conventional cam method.

FIG. 5 shows a rotor drive circuit which is used in the embodiment of the present invention; FIG. 6 shows a logic control circuit; and FIG. 7 shows a timing chart of the logic control circuit.

In FIG. 5, an operational amplifier 100, transistors 103, 111, and resistors 104, 109, 110 together constitute a constant current circuit for causing electrical current to flow through the rotor in the positive direction, whereby the output $\overline{RPOSI}$ of the logic circuit becomes L-level, the rotor being electrically charged by turning the transistor 102 OFF through the resistance 101.

In a similar manner, an operational amplifier 113, transistors 105, 112, and resistors 104, 106, 107 together constitute a constant current circuit for causing electrical current to flow through the rotor in the reverse direction whereby the output $\overline{RNEGA}$ of the logic circuit becomes L-level, the rotor being electrically charged by turning the transistor 114 OFF through the resistance 115.

The logic control circuit shown in FIG. 6 is described with reference to the timing charts shown in FIG. 7. Firstly, when a system reset circuit is actuated in the initial state, the output RESET becomes H-level so that a binary counter 151, RS flip-flops 153, 156, 161, 166, 172, 176, 181, 187, and D flip-flops 195, 196 are reset, and RS flip-flop 154, 157, 162, 167, 173, 177, 182, 188 are put into a state of being set.

Accordingly, in this state, the outputs of all NAND gates 155, 158, 163, 168, 174, 178, 183, 189 are at H-level, the output RPOSI of a NAND gate 190 is at L-level, the output RNEGA of an AND gate 197 is also at H-level, and the electrical charging of the rotor is stopped.

When the reset state is released, the binary counter 151 divides the frequency of the output CLOCK of an oscillator 150 and starts to count up. When the output Q1 of the binary counter 151 reaches the H-level, the RS flip-flop 153 is set and the output of the NAND gate 155 becomes L-level. As a result, the output RPOSI of the NAND gate 190 becomes H-level and the rotor is thus started and is electrically charged in the positive direction.

As the counting-up proceeds and the output Q2 reaches the H-level, the RS flip-flop 154 is reset and the output of the NAND gate 155 again becomes H-level. Thus, output RPOSI of NAND gate 190 becomes L-level and the electrical charging in the positive direction is stopped. In synchronization with the falling of the output RPOSI, a one-shot circuit comprising D flip-flop circuits 195, 196 and an AND gate 197 is operated so that the output RNEGA of the AND gate 197 becomes H-level and the rotor is electrically charged in the reverse direction.

The lens barrel 1 is moved by an amount equivalent to one tooth each time electrical charging takes place in the positive and the reverse directions, respectively. In a similar manner, second electrical charging is started in the positive direction at the point at which both outputs Q1 and Q2 of the binary counter 151 become H-level, and this charging is stopped and electrical charging starts in the reverse direction at the point at which both outputs Q1 and Q3 of the binary counter 151 become H-level. This charging in the reverse direction is stopped at the next rising of the output CLOCK. During this second electrical charging in the positive direction, the charging time is extended for one CLOCK width as compared with that in the first charging, as shown in FIG. 7 and this charging time is extended by one CLOCK width in each of the third and fourth charging.

As described above, in accordance with the outputs of the control circuit shown in FIG. 6, the charging time in the positive direction is extended for one CLOCK width during each electrical charging in the positive direction, and the charging in the reverse direction starts at the same time as the charging in the positive direction stops, and continues for a period of time corresponding to half a CLOCK width.

In this embodiment, the charging time during the first electrical charging in the positive direction and the increments of the charging time in the succeeding steps of charging are set at a value corresponding to one CLOCK width, but the charging time for the first electrical charging in the positive direction can be made longer than the increments of the charging time in the succeeding steps of charging by effecting a change in the decoder circuit shown in FIG. 6. As a matter of course, it is possible for the charging time applied in each electrical charging to be set at a value which is smaller than the charging time in the positive-direction charging.

When the focus adjustment is completed in the manner described above, an exposure control is next performed. When the rotor 12 is electrically charged in the direction opposite to that employed in the focus adjustment, the force which is opposite to the above-described adjustment acts on the rotor 12, whereby the rotor 12 and the rotor receiving member 13 start to rotate counterclockwise.

As the rotor receiving member 13 starts to rotate counterclockwise, the dowel 13d pushes the arm 16d of the ratchet claw 16 which is thus rotated clockwise so that the engagement of the claw portion 16a with the ratchet member 9 is released. However, since the ratchet member 9 is engaged with the claw portion 17a of the feed claw 17, the lens barrel 1 is not returned to its initial position by the urging force of the spring 3.

Furthermore, since the dowel 13c pushes the dowel 21a of the connection lever 21, this connection lever 21 starts to rotate clockwise and the dowel 21d pushes the side 25c of the stopping lever 25, which thus starts to rotate counterclockwise.

When the stopping lever 25 is rotated counterclockwise, the engagement of the end surface 25b with the arm 23d of the blade drive lever 23 is released, and the blade drive lever 23 is rotated counterclockwise by the urging force of the spring 24, drives the shutter blade 27 through the dowel 23c in the opening direction, and is stopped by the dowel 23b making contact with the wall 21c of the connection lever 21.

When exposure is controlled by opening the shutter blade and an appropriate amount of exposure is effected, the rotor 12 is stopped to be electrically charged in the reverse direction.

When the rotor 12 is stopped to be electrically charged in the reverse direction, the connection lever 21 is rotated counterclockwise by the urging force of the spring 22, the wall 21c pushes the dowel 23b of the blade drive lever 23 which is thus rotated clockwise and returned to its initial position so as to close the shutter blade 27, and the dowel 21a pushes the dowel 13c of the rotor receiving member 13 so as to return the rotor 12 and the rotor receiving member 13 to their initial positions.

The exposure control is thus completed in this manner. The detection and control of an appropriate amount of exposure may be performed by any of the known methods and description thereof is omitted because it has no direct relation to the objects of the present invention.

When the abutting of the arm 6e on the arm 19c is released by the lens-barrel interlocking member 6 forwardly moved to the left by the above-described focus adjustment, the latch claw 19 has the tendency to rotate counterclockwise due to the urging force of the spring 20, but it is stopped by the arm 19a abutting against the wall 16c of the ratchet claw 16.

When the ratchet claw 16 is rotated clockwise by the above-described exposure control operations, the contact between the wall 16c and the arm 19a is removed so that the latch claw 19 is rotated counterclockwise and a surface 19e abuts against the wall 16c.

When the rotor receiving member 13 is rotated clockwise by cutting off the above-described electrical charging to the rotor 12 in the reverse direction, the dowel 13d is freed and the ratchet claw 16 has the tendency to rotate counterclockwise by the urging force of the spring 18a but is stopped by the wall 16c abutting against the surface 19b, so the claw portion 16a does not engage with the ratchet member 9.

As seen from the above description, there are two differences between the state at the completion of a focus adjustment and exposure control and the initial state. These differences are that the lens barrel 1 is moved and that it is stopped in a state in which the ratchet claw 16 has been rotated clockwise.

Therefore, the rotor 12 is again electrically charged in the positive direction in order to return the above-described two differences to the initial state. When electrically charged in the positive direction, the rotor 12 operates to feed the lens barrel 1 by amount equivalent to one tooth. This operation is described below.

Figure 2B:
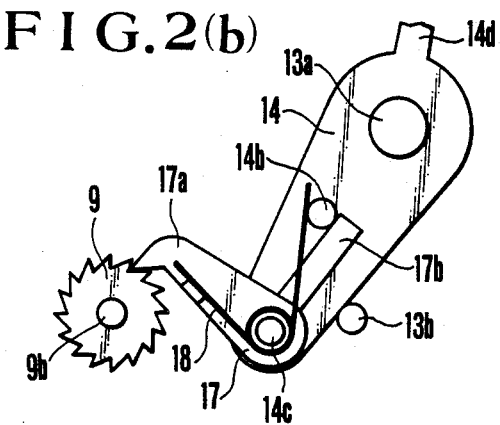
Figure 2C:
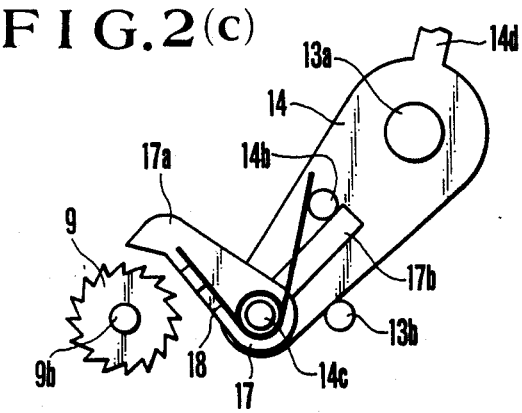

FIGS. 2(a), 2(b) and 2(c) show the relationships between the ratchet member 9 and the feed claw 17 during the above-described feed operation. FIG. 2(a) shows the initial state, FIG. 2(b) shows the state in the course of the feed operation, and FIG. 2(c) shows the state at the completion of the feed operation, the same portions as those shown in FIG. 1 being denoted by the same reference numbers.

Firstly, in the initial state shown in FIG. 2(a), when the dowel 13b is rotated clockwise around the shaft 13a by the driving force of the rotor 12 so as to rotate the claw drive lever 14 clockwise, the claw 17 rotates the ratchet member 9 counterclockwise through the dowel 14c. At this time, the feed claw 17 and the ratchet member 9 are engaged with each other so that they are allowed to rotate and as the feed operation advances, the feed claw 17 is rotated counterclockwise around the dowel 14c as it follows ratchet member 9 by virtue of the urging force of the spring 18.

Then, in the course of the feed operation shown in FIG. 2(b), the arm 17b of the feed claw 17 abuts against the dowel 14b which is planted in the claw drive lever 14, so that the feed claw 17 can no longer rotate counterclockwise around the dowel 14c. Consequently, the feed claw 17 rotates integrally with the claw drive lever 14 around the shaft 13a and as the claw 17 rotates, the claw portion 17a moves so as to release the engagement with the ratchet member 9 while further rotating it counterclockwise, the engagement then being finally removed, as shown in FIG. 2(c).

After the above-described operations for feeding, the feed claw 17 and the claw drive lever 14 are returned to the initial state shown in FIG. 2(a) when the electrical charging to the rotor 12 in the positive direction is cut off.

As described above, when the electrical charging to the rotor 12 in the positive direction effects feeding by amount equivalent to one tooth, the engagement of the ratchet member 9 with the feed claw 17 is released at the final stage of the feed operation. However, since the ratchet claw 16 is engaged with the ratchet member 9 during the focus adjustment, the lens barrel 1 is not returned to the initial state by the urging force of the spring 3 and the ratchet member 9 is not rotated clockwise, the lens barrel 1 being supported in position after this movement.

As described above, in the state existing at the completion of the focus adjustment and the exposure control, the ratchet claw 16 is in the state in which it has been rotated clockwise, i.e. in which its engagement with the ratchet member 9 is released, and is stopped by its engagement with the latch claw 19. Therefore, when the rotor 12 is electrically charged in the positive direction and the engagement of the feed claw 17 with the ratchet member 9 is released, as shown in FIG. 2(c), the ratchet member 9 is in a free state so that the lens barrel 1 is moved backward in a sliding manner (to the right as viewed in FIG. 1), and at the same time the ratchet member 9 is also rotated clockwise to return to its initial position.

At the final stage of the returning action, the arm 6e pushes the arm 19c of the latch claw 19 so as to rotate the latch claw 19 clockwise and is stopped by coming into contact with the dowel 8. By the clockwise rotation of the latch claw 19, the stopping of the ratchet claw 16 is released and the ratchet claw 19 is thus rotated counterclockwise by the energizing force of the spring 18 so as to return to the initial position in which it is engaged with the ratchet member 9. The focus adjustment, the exposure control, and the initial state return action are performed by the operations described above without any trouble.

In this embodiment, the charging time is extended stepwise, with a constant current value, but the current may also be stepwise increased if desired, with a constant charging time being adopted, whereby similar effects are obtained.

The present invention described above is capable of greatly reducing the mechanical sounds of impacts produced by the stepping drive unit of a camera with very high effectiveness.

What is claimed is:

1. A stepping drive unit for a camera, comprising:
   a photographic optical system;
   urging means for urging said photographic optical system to an initial position;
   ratchet means for displacing said photographic optical system against an urging force of said urging means, said ratchet means including drive means for stepwisely displacing said photographic optical system against the urging force of said urging means and preventing means for preventing said photographic optical system from being returned to the initial position by said urging means; and
   operation means operable in two directions, wherein in the first direction said operating means operates said drive means to displace said photographic optical system, and wherein in the second direction said operating means releases said preventing means to permit said photographic optical system to return tot he initial position 2. A drive unit according to claim 1, wherein said operation means displaces itself in a first range in a first direction and displaces itself in a second range in a second direction.

3. A drive unit according to claim 2, wherein said operation means includes electromagnetic drive means.

4. A drive unit according to claim 1, wherein said operation means includes electromagnetic drive means.

5. A drive unit according to claim 1, wherein said operation means releases said prevention means in the second direction to permit said photographic optical system to return to the initial position without stepwise displacement of said photographic optical system.

6. A camera, comprising:
   a photographic optical system;
   urging means for urging said photographic optical system to an initial position;
   ratchet means for displacing said photographic optical system against an urging force of said urging means, said ratchet means including drive means for stepwisely displacing said photographic optical system against the urging force of said urging means and preventing means for preventing said photographic optical system from being returned to the initial position by said urging means; and
   operation means operable in two directions wherein in the first direction said operation means operates said drive means to displace said photographic optical system, and wherein in the second direction, said operation means releases said preventing means to permit said photographic optical system to return to the initial position.

7. A camera according to claim 6, wherein said operation means displaces itself in a first range in a first operation mode and displaces itself in a second range in a second operation mode.

8. A camera according to claim 7, wherein said operation means includes electromagnetic drive means.

9. A camera according to claim 6, said operation means includes electromagnetic drive means.

10. A camera according to claim 6, wherein said operation means releases said prevention means in the second operation mode to permit said photographic optical system to return to the initial position without stepwise displacement of said photographic optical system.

* * * * *

UNITED STATES PATENT AND TRADEMARK OFFICE
CERTIFICATE OF CORRECTION

PATENT NO. : 4,935,764

DATED : June 19, 1990

INVENTOR(S) : NAKAZAWA, ET AL.

It is certified that error appears in the above-identified patent and that said Letters Patent is hereby corrected as shown below:

On the title page item [75]:

"Yasuhik Shiomi," should read --Yasuhiko Shiomi--.

COLUMN 5

Line 57, "adjusting" should read --adjustment--.

COLUMN 6

Line 66, "HOwever," should read --However,--.

COLUMN 11

Line 9, "stepwisely" should read --stepwise--.
Line 20, "tot he" should read --to the-- and "position" should read --position.--.

UNITED STATES PATENT AND TRADEMARK OFFICE
CERTIFICATE OF CORRECTION

PATENT NO. : 4,935,764

DATED : June 19, 1990

INVENTOR(S) : Nakazawa, et al

It is certified that error appears in the above-identified patent and that said Letters Patent is hereby corrected as shown below:

COLUMN 12

Line 8, "stepwisely" should read --stepwise--.
Line 26, "claim 6, said" should read --claim 6, wherein said--.

Signed and Sealed this

First Day of December, 1992

Attest:

DOUGLAS B. COMER

Attesting Officer

Acting Commissioner of Patents and Trademarks